(12) United States Patent
Grayson et al.

(10) Patent No.: US 8,817,696 B2
(45) Date of Patent: Aug. 26, 2014

(54) ENHANCED UNLICENSED MOBILE ACCESS NETWORK ARCHITECTURE

(75) Inventors: Mark Grayson, Maidenhead (GB); Jayaraman Iyer, Sunnyvale, CA (US); Kevin Shatzkamer, New York, NY (US); Richard Kyle Forster, San Francisco, CA (US); Anand K. Oswal, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1248 days.

(21) Appl. No.: 11/439,010

(22) Filed: May 22, 2006

(65) Prior Publication Data

US 2007/0268855 A1    Nov. 22, 2007

(51) Int. Cl.
*H04L 12/66* (2006.01)
*H04W 92/02* (2009.01)
*H04W 88/12* (2009.01)
*H04W 88/16* (2009.01)

(52) U.S. Cl.
CPC .............. *H04W 92/02* (2013.01); *H04W 88/12* (2013.01); *H04W 88/16* (2013.01)
USPC ........... 370/328; 370/352; 370/392; 370/356; 370/395.2; 370/229; 455/410; 455/433; 455/458; 455/414.2; 455/439

(58) Field of Classification Search
CPC ............ H04Q 7/00; H04L 9/32; H04L 12/66; H04L 12/28
USPC .............. 370/328, 395.2, 248, 349, 355, 352, 370/392, 356, 229; 455/439, 445, 552.1, 455/553.1, 410, 433, 414.2; 709/246
See application file for complete search history.

(56) References Cited

U.S. PATENT DOCUMENTS

| 7,280,826 B2 | 10/2007 | Nylander et al. |
| 7,352,750 B2 * | 4/2008 | Igarashi et al. ............... 370/392 |

(Continued)

FOREIGN PATENT DOCUMENTS

| EP | 0921701 | 6/1999 |
| EP | 1207708 | 5/2002 |

(Continued)

OTHER PUBLICATIONS

"UMA Architecture (Stage 2), Unlicensed Mobile Access (UMA); Architecture (Stage 2)", Aquired at: http://kom.aau.dk/~ff/UMA/Stage2.pdf, 1 page, 2004 Alcatel, AT&T Wireless Services.

(Continued)

*Primary Examiner* — Michael T Vu
(74) *Attorney, Agent, or Firm* — Patent Capital Group

(57) ABSTRACT

An Unlicensed Mobile Access (UMA) network architecture. In a specific embodiment, the network architecture includes a mobile station and an access point in communication with the mobile station. A UMA Controller (UNC) communicates with the access point. A Service GateWay (SGW) communicates with the UMA controller. The SGW includes functionality to route user-plane packets in the UMA. In a more specific embodiment, the functionality includes UNC user-plane functionality offloaded from the UNC to the SGW; Serving GPRS Support Node (SGSN) user-plane functionality; access-authentication functionality sufficient to enable the SGW to enable the SGW to bypass a legacy SGSN control plane; and/or Radio Network Controller (RNC) user-plane functionality sufficient to enable communications between the SGW and the RNC.

17 Claims, 5 Drawing Sheets

(56) References Cited

U.S. PATENT DOCUMENTS

| | | | |
|---|---|---|---|
| 2002/0006114 A1* | 1/2002 | Bjelland et al. | 370/248 |
| 2004/0043758 A1 | 3/2004 | Sorvari et al. | |
| 2004/0116120 A1 | 6/2004 | Gallagher et al. | |
| 2005/0037708 A1 | 2/2005 | Torvinen | |
| 2005/0239445 A1 | 10/2005 | Karaoguz et al. | |
| 2005/0265279 A1 | 12/2005 | Markovic et al. | |
| 2005/0272449 A1 | 12/2005 | Gallagher et al. | |
| 2006/0089123 A1 | 4/2006 | Frank | |
| 2006/0095954 A1 | 5/2006 | Buckley et al. | |
| 2006/0262778 A1* | 11/2006 | Haumont et al. | 370/356 |
| 2007/0041360 A1* | 2/2007 | Gallagher et al. | 370/352 |
| 2007/0083470 A1* | 4/2007 | Bonner et al. | 705/51 |
| 2007/0097958 A1* | 5/2007 | Lappalainen | 370/352 |
| 2007/0188298 A1 | 8/2007 | Tariq et al. | |
| 2007/0268908 A1* | 11/2007 | Linkola et al. | 370/395.2 |
| 2008/0031214 A1 | 2/2008 | Grayson et al. | |
| 2008/0039087 A1 | 2/2008 | Gallagher et al. | |
| 2008/0254833 A1 | 10/2008 | Keevill et al. | |
| 2009/0061879 A9* | 3/2009 | Gallagher et al. | 455/439 |

FOREIGN PATENT DOCUMENTS

| | | |
|---|---|---|
| EP | 2337410 | 6/2011 |
| WO | WO 2005/079087 | 8/2005 |
| WO | WO 2006/024887 | 3/2006 |
| WO | WO 2007/139641 | 12/2007 |
| WO | EP 2030122 | 3/2009 |

OTHER PUBLICATIONS

"UMA Technology", Aquired at: http://www.umatechnology.org/technology/index.htm 2 pages, 2004-2005.

EPO Jul. 9, 2012 Response to Communication dated Dec. 19, 2012 from EP Application No. 07756014; 14 pages.

USPTO Sep. 2, 2011 Response to Non-Final Office Action mailed Jun. 8, 2011 from U.S. Appl. No. 11/500,807.

USPTO Nov. 18, 2011 Final Office Action from U.S. Appl. No. 11/500,807.

EPO Dec. 16, 2011 Extended European Search Report and Opinion from EP Application No. EP07756014; 6 pages.

PCT International Preliminary Report on Patentability and Written Opinion of the International Searching Authority mailed Nov. 27, 2008 for PCT/US2007/010034; 6 pages.

PCT International Search Report mailed Feb. 13, 2008 for PCT/U52007/010034; 1 page.

PCT Apr. 25, 2005 International Search Report from International Application No. PCT/IB2004002814;2 pages.

PCT Jul. 31, 2006 International Preliminary Report on Patentability and Written Opinion from International Application No. PCT/IB2004002814; 10 pages.

EPO May 24, 2011Extended European Search Report and Opinion from EP Application No. EP11160985; 6 pages.

Ala-Laurila J., et al. "Wireless LAN Access Network Architecture for Mobile Operators," IEEE Communications Magazine, IEEE Service Center, New Jersey, vol. 39, No. 11, Nov. 2001, pp. 82-89.

EPO Sep. 11, 2012 Communication from European Application No. 07756014; 5 pages.

USPTO Jun. 8, 2011 Non-Final Office Action from U.S. Appl. No. 11/500,807.

EPO Mar. 21, 2013 Response to Communication dated Sep. 11, 2012 from EP Application No. 07756014; 5 pages.

* cited by examiner

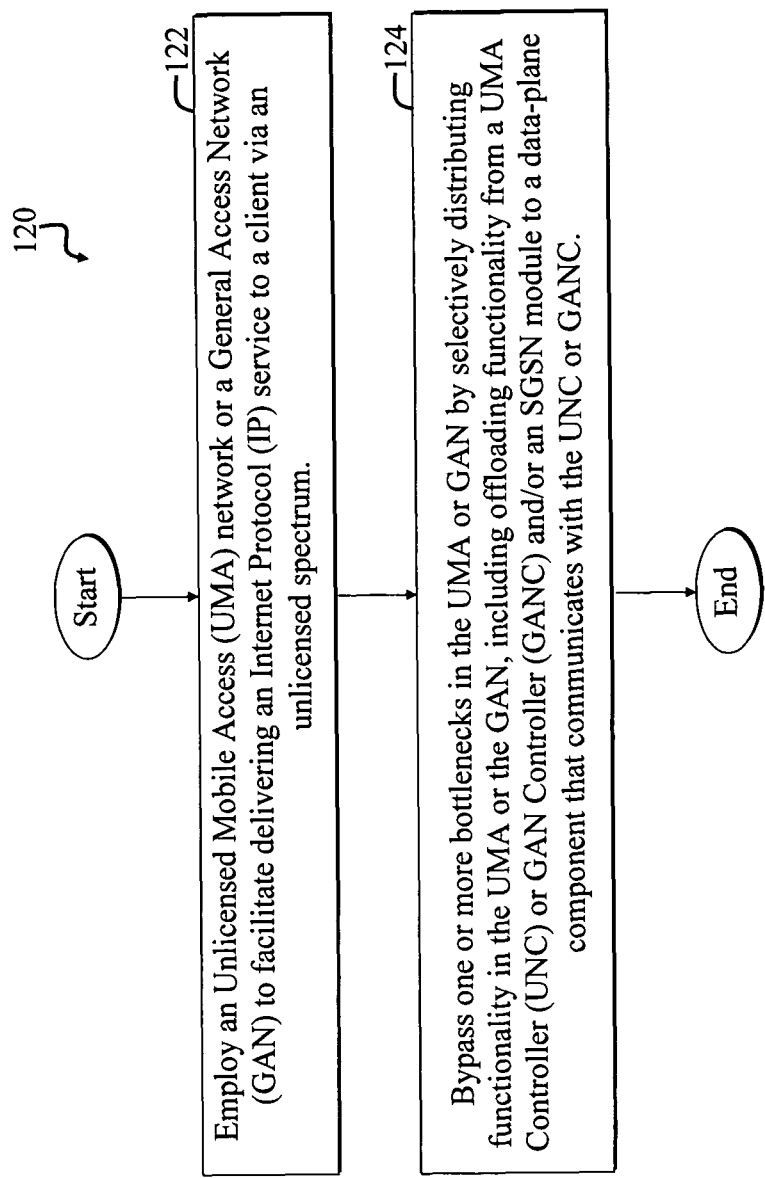

ENHANCED UNLICENSED MOBILE ACCESS NETWORK ARCHITECTURE

BACKGROUND OF THE INVENTION

This invention is related in general to networks and more specifically relates to network architectures and accompanying systems and methods for configuring Unlicensed Mobile Access (UMA) networks to efficiently provide Internet Protocol (IP) services to clients connected to the UMA.

The terms UMA and Generic Access Network (GAN) are employed interchangeably herein. For the purposes of the present discussion, a UMA network or a GAN may be may be any packet-switched network that facilitates interfacing a wireless device, such as a wireless Voice Over Internet Protocol (VOIP) client, with one or more networks that offer services usable by the wireless device. Services may be any functionality that is usable by the wireless device, such as broadband IP services involving file-transfer, VOIP, or Global System for Mobile Communications (GSM) functionality. Examples of wireless devices, called Mobile Stations (MSs), include wireless phones, laptops with IEEE 802.11 wireless cards, and so on.

UMA networks are employed in various demanding applications including home and business-based Short Message Services (SMS), MultiMedia Services (MMS), file transfers, voice calls, and so on. Such applications often demand UMA networks that interface wireless data networks, such as Institute of Electrical and Electronics Engineers (IEEE) 802.11a, 802.11b, or 802.16 networks, with other networks, such as the Internet, the Public Switched Telephone Network (PSTN), and cellular networks.

An exemplary UMA network includes a multimode wireless phone with UMA and cellular capabilities in communication with a wireless Access Point (AP) via WiFi. The multimode phone connects to a Security GateWay (SGW) via Internet Protocol SECurity (IPSEC) and connects to a UMA Controller (UNC) via Transmission Control Protocol (TC). which communicates with a UMA Controller (UNC). The UNC connects to a General Packet Radio Services (GPRS) network via a Serving GPRS Support Node (SGSN). In this example, the GPRS network connects to a cellular network and the Internet via the SGSN. The UNC employs the SGSN to facilitate routing data between the wireless phone, the cellular network, and the Internet as needed to provide desired services to the wireless phone. The UNC and the SGSN also facilitate handovers between UMA networks and other networks, such as cellular networks, as the mobile phone moves between the networks. The SGW and the UNC may employ an Authentication, Authorization, and Accounting (AAA) server and a Home Location Register (HLR) for authentication.

Unfortunately, conventional UMA network architectures exhibit inherent traffic bottlenecks, such as at the UNC and the SGSN, which inhibit wireless clients from effectively utilizing high bandwidth afforded by use of unlicensed spectrum by UMA/GAN networks.

BRIEF DESCRIPTION OF THE DRAWINGS

FIG. 5 is a flow diagram of a method adapted for use with the UMA networks of FIGS. 1-4.

DETAILED DESCRIPTION OF EMBODIMENTS OF THE INVENTION

A preferred embodiment of the present invention implements an enhanced Unlicensed Mobile Access (UMA) network. In a specific embodiment, the UMA network includes an offload device, also called a data-plane component, in communication with a UMA Controller (UNC), also called a Generic Access Network Controller (GANC). The offload device is equipped with functionality for facilitating handling User-plane (U-plane) packet transfers so that the U-plane packet transfers need not be routed via conventional UNC or SGSN modules, which are undesirably susceptible to network traffic bottlenecks. The offload device is said to exhibit functionality that has been selectively offloaded, copied, or otherwise moved from one or more modules in the network, such as SGSN, UNC, and/or Radio Network Controller (RNC) modules. In the preferred embodiment, the offload device is a Security GateWay (SGW). For the purposes of the present discussion, functionality may be anything, such as a hardware or software module, device component, and so on, that performs or otherwise enables one or more functions, capabilities, or tasks.

By selectively distributing functionality in a UMA network in accordance with embodiments of the present invention, certain traffic bottlenecks are removed. This facilitates efficient delivery of high speed Internet Protocol (IP) services, such as Voice Over Internet Protocol (VOIP), streaming video, Short Message Services (SMS), and so on, over a UMA or Generic Access Network (GAN) architecture.

For clarity, various well-known components, such as power supplies, modems, firewalls, network cards, Internet Service Providers (ISPs), Internet Protocol SECurity (IPSEC) concentrators, Media GateWays (MGWs), Mobile Switching Centers (MSCs), load balancers, and so on, have been omitted from the figures. However, those skilled in the art with access to the present teachings will know which components to implement and how to implement them to meet the needs of a given application.

Figure 1:
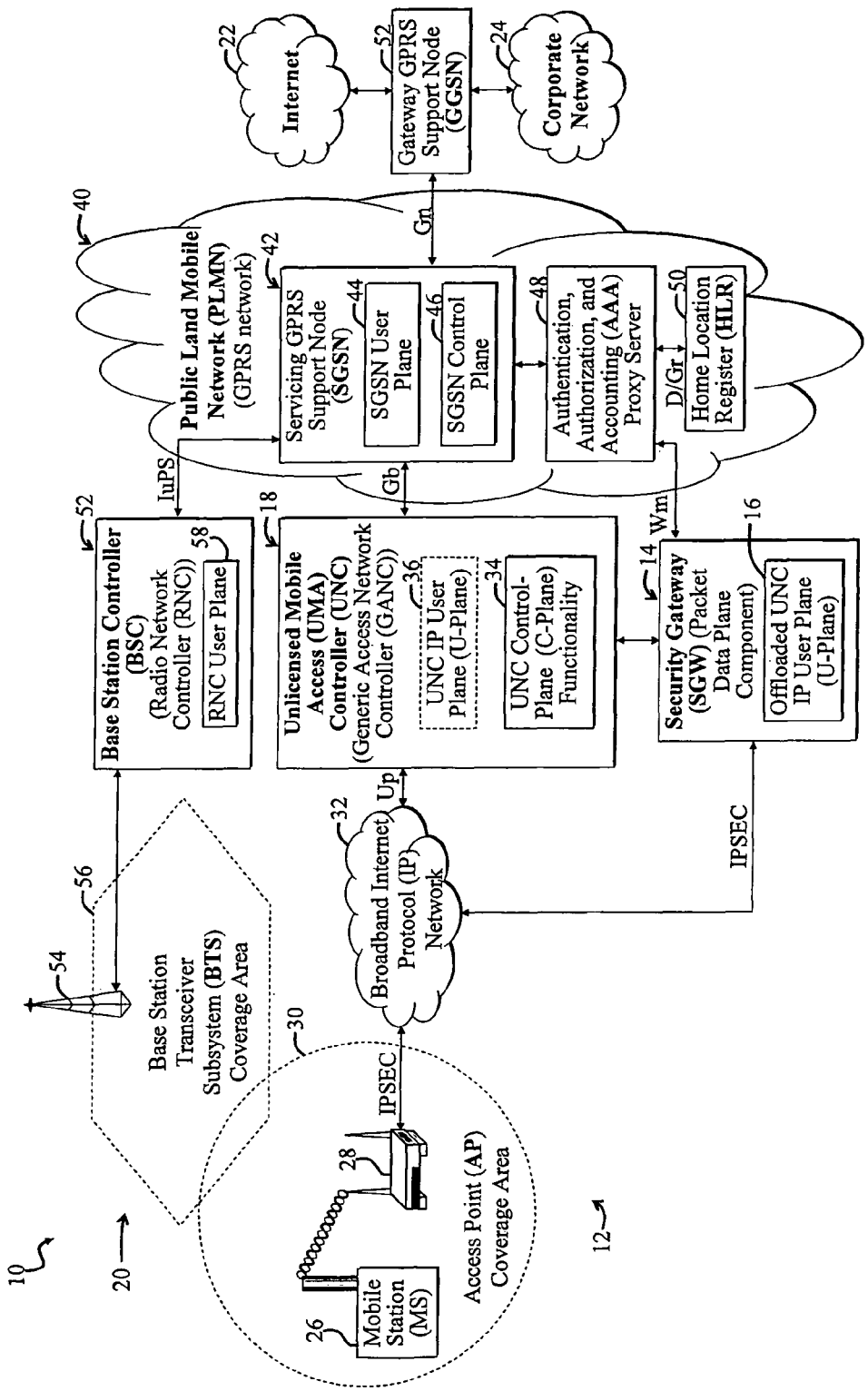
FIG. 1 is a diagram illustrating a UMA network employing a Security GateWay (SGW) with IP User-plane (U-plane) functionality offloaded from a UNC according to a first embodiment of the present invention.

FIG. 1 is a diagram illustrating a UMA network 12 employing a first Security GateWay (SGW) 14 that has been augmented with IP U-plane functionality 16 according to a first embodiment of the present invention. The IP U-plane functionality 16 has been offloaded from a UNC 18. For the purposes of the present discussion, to offload functionality means to move or copy functionality from one module or network entity to another module or network entity.

The UMA network 12 is part of an overall network 10, which for illustrative purposes further includes a cellular network 20, the Internet 22, and a corporate network 24. The UMA network 12 includes a mobile station 26, Access Point (AP) 28, a broadband Internet Protocol (IP) network 32, the UNC 18, the SGW 14, and a Public Land Mobile Network (PLMN) 40. In the present specific embodiment, the PLMN 40 is a packet-switched network that may be implemented via a conventional General Packet Radio Service (GPRS) network.

The mobile station 26 wirelessly communicates with the AP 28, which is associated with an AP coverage area 30. A mobile station 26 may be any device that can communicate wirelessly with a network. Examples of mobile stations include wireless phones, laptops with IEEE 802.11 wireless cards, other wireless clients, and so on. The AP 28 may be an IEEE 802.11a, 802.11b, 802.16, or other type of AP that facilitates connecting the mobile station 12 to the network 10.

The AP 28 communicates with the broadband IP network 32 via an Internet Protocol SECurity (IPSEC) secure tunnel. The broadband IP network 32 is connected between the AP 28 and the UNC 18 and between the AP 28 and the accompanying SGW 14. The UNC 18 includes Control-plane (C-plane) functionality 34 and optionally includes native UNC IP U-plane functionality 36 as discussed more fully below. The interface between the UNC 18 and the broadband IP network 32 is called a Up interface.

For illustrative purposes, the PLMN 40 is shown including a Serving GPRS Support Node (SGSN) 42, a Home Location Register (HLR) 50, and an Authentication, Authorization, and Accounting (AAA) proxy server 48 connected therebetween. The SGSN 42 is shown including SGSN U-plane functionality 44 and SGSN C-plane functionality 46. The SGSN 42 communicates with the UNC 18 via a Gb interface and communicates with a Gateway GPRS Support Node (GGSN) 52 via a Gn interface. The GGSN 52 acts as an interface gateway between the Internet and corporate networks 22, 24 and the SGSN 42 of the PLMN 40. The AAA proxy server 48 communicates with the HLR 50 via a D/Gr interface. The SGSN 42 further communicates with a Base Station Controller (BSC), also called a Radio Network Controller (RNC) 52, via an IuPS (user Interface Packet Switched) and/or a Gb interface.

The BSC 52 is part of the cellular network 20, which further includes a Base Station Transceiver Subsystems (BTSs) 54, which is associated with a BTS coverage area 56. The cellular network 20 may include additional network components, such as mobile stations, plural BTSs, one or more Mobile Switching Centers (MSCs), constituent private networks, and so on, without departing from the scope of the present invention. The BSC 54 coordinates messaging between one or more Base Station Transceiver Subsystems (BTSs) 54 and the PLMN 40. The BSC 52 includes RNC U-plane functionality 58, which facilitates establishing the Gb and/or IuPS interface with the SGSN 42. The Gb and IuPS interface(s) supports one or more Radio Access Network Application Part (RANAP) protocols.

UNC U-plane functionality may be any user-plane functionality that is conventionally included in a UNC or Base Station Controller (BSC). For the purposes of the present discussion, the terms UNC and BSC are employed interchangeably.

Generally, U-plane functionality may be any functionality pertaining to data, i.e., bearer traffic, also called transport-set traffic. U-plane functionality may correspond to functionality associated with layers 1-4 of the Open Systems Interconnect (OSI) standard. C-plane functionality may be any functionality associated with layers 5-7 of the OSI standard.

In operation, the UMA network 12, which may also be implemented via a 3rd Generation Partnership Project (3GPP) Generic Access Network, facilitates providing IP services to the mobile station 26 using unlicensed spectrum for wireless transmissions between the AP 28 and the mobile station 26.

For the purposes of the present discussion, an unlicensed spectrum may be any frequency or band of frequencies comprising a portion of the electromagnetic spectrum that is not sold, licensed, or regulated by a central controller, such as the Federal Communications Commission (FCC). The unlicensed spectrum is also called the free spectrum or the open spectrum.

IP services may be any services or functionality that may be offered via an IP network. Examples of IP services include VOIP services, file transfer services, and GSM services, such as SMS services.

The UMA network 12 is adapted to provide full GSM service over the broadband IP network 32, either to the mobile station 26, which is a dual mode phone in the present specific embodiment, or to a conventional legacy mobile phone with an embedded UMA client. The UMA 12 facilitates significantly decreasing costs associated with delivering new IP services in residential and small-business environments by obviating expensive transmission lines, base station equipment, and so on. The UNC 18 and the GGSN 52 may also facilitate handovers of the mobile station 26, also called the client, between networks, such as the UMA 12 and the cellular network 20.

The ability to deliver higher data rate services over the UMA network 12 is no longer constrained by spectrum, BTS power limits or the requirement to increase signal transmission energy to penetrate buildings to reach the residential environments. In such residential and small business environments, the ability to deliver higher speed data service is conventionally limited by the accompanying UMA architecture. In existing architectures, IP data services are typically routed via the a UMA Controller element and an accompanying SGSN, which unfortunately, are often scaled to only accommodated slower data speeds associated with users of networks, such as cellular networks, which may be constrained by various factors, such as spectrum, power, and/or link-margin requirements.

The UMA network 12 is adapted to eliminate certain network traffic bottlenecks by selectively shifting functionality between modules of the overall network 10 to reduce reliance upon certain modules that are associated with bottlenecks. For example, functionality, such as the offloaded UNC IP U-plane functionality 16 in the SGW 14, facilitates enabling the UMA 12 to efficiently offer high speed data services to the mobile station 26 without requiring routing of certain U-plane packets via the UNC 18. In the original UMA environment, the SGW terminates the IPSEC traffic and unwraps the data that is coming from the client and then forwards subsequent traffic to the GANC.

In the present specific embodiment, the offloaded UNC IP U-plane functionality 16 included in the SGW 14 is a version of the native UNC IP U-plane functionality 36 of the UNC 18. This version has been modified to work with the SGW 14, thereby enabling traffic that would ordinarily pass through the UNC IP U-plane 36 to pass through the offloaded UNC IP U-plane 16 of the SGW 14 instead. This obviates a network traffic bottleneck that often occurs with traffic passing through the native UNC IP U-plane UNC 18. Exact modifications are application specific and may be readily determined by those skilled in the art with access to the present teachings without undue experimentation.

The SGW 14 may be incorporated within the UNC 18 without departing from the scope of the present invention. The SGW 14 represents a terminal end for IPSEC traffic established via an IPSEC tunnel between the mobile station 26 and the SGW 14 over the broadband IP network 32.

The SGW 14 acts as a data plane component for the purposes of the present discussion. A data-plane component may be any functionality associated with layers 1-4 of the OSI standard or associated with data traffic (as opposed to control traffic) required to provide a service to a client that is connected to a network.

Hence, the UMA network 12 of FIG. 1 employs the SGW 14, which acts as an external element, i.e., an element that is external to the UNC 18, to offload IP U-plane functionality 36, yielding offloaded UNC IP U-plane functionality 16 in response thereto. The UNC U-plane functionality 36 is said to be offloaded towards the packet data-plane component, i.e., the SGW 14, to enable increased efficiency of IP data service delivery by avoiding a traffic bottleneck conventionally associated with routing data packets through the UNC IP U-plane functionality 36 included in the UNC 18. By removing or moving U-plane functionality to the SGW 14, a previous UNC traffic bottleneck is relieved.

Figure 2:
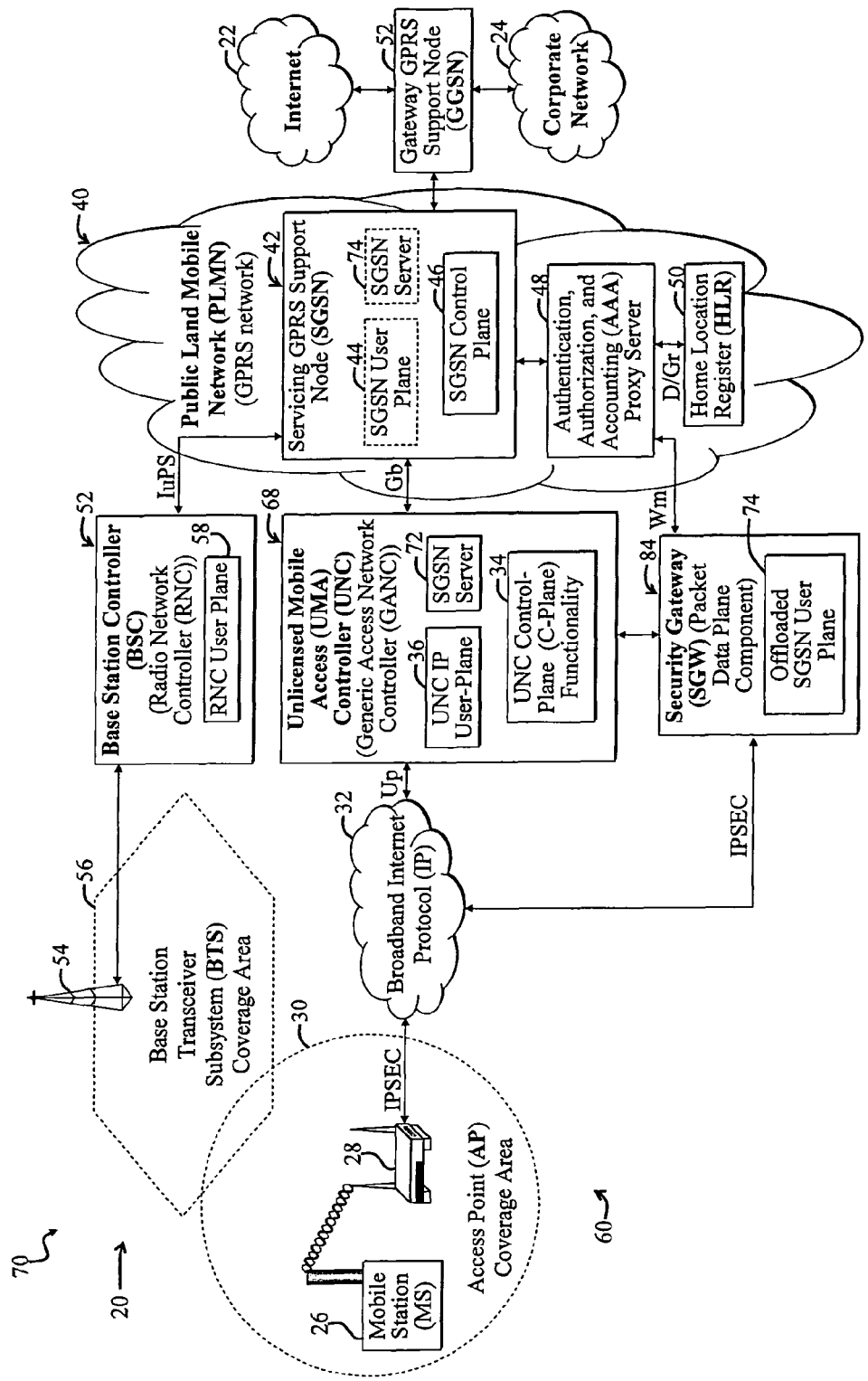
FIG. 2 is a diagram illustrating a UMA network employing an SGW augmented with SGSN U-plane and a UNC augmented with SGSN server functionality according to a second embodiment of the present invention.

FIG. 2 is a diagram illustrating a second UMA network 60 employing a second augmented SGW 64, which is augmented with SGSN U-plane functionality and UNC U-plane functionality 74 according to a second embodiment of the present invention. The second UMA network 60 is part of a second overall network 70.

The construction and operation of the second overall network 70 is similar to the construction and operation of the first overall network 10 of FIG. 1 with some exceptions. In particular, with reference to FIGS. 1 and 2, the first UNC 18 of FIG. 1 has been replaced with a second augmented UNC 68 in FIG. 2. The second augmented UNC 68 of FIG. 2 includes SGSN server functionality 72, which represents selectively distributed functionality that has been offloaded from the SGSN node 42. In the present specific embodiment, the SGSN server functionality 72 represents an approximate copy of SGSN server functionality 74 in the SGSN server 42. In some applications, the native SGSN server functionality 74 is removed from the SGSN 42 when the second UNC 68 is augmented with the SGSN server functionality 72. Whether or not the native SGSN server functionality 74 remains with the SGSN 42 is application specific. One skilled in the art with access to the present teachings may readily determine whether to leave the SGSN server functionality 74 in place to meet the needs of a given application.

For the purposes of the present discussion, selectively distributed functionality may be any functionality that has been moved relative to a conventional network configuration. In the present specific embodiment, the selectively distributed functionality, such as SGSN-server functionality, has been moved so as to relieve certain traffic bottlenecks, such as a bottleneck that would generally occur at interfaces of the SGSN 42 between the BSC 52 and/or the GGSN 52. SGSN-server functionality may be any functionality that is conventionally associated with an SGSN server. Exemplary SGSN server functionality includes serving location updates pertaining to the location of a mobile station, such as the mobile station 26, communicating with a UMA, such as the UMA 60.

Furthermore, in the overall network 70 of FIG. 2, the first augmented SGW 14 of FIG. 1 has been replaced with a second segmented SGW 84 in FIG. 2. The second augmented SGW 84 includes offloaded SGSN U-plane functionality 74, which corresponds to the SGSN U-plane 44. In certain applications, the native SGSN user plane functionality 44 in the SGSN 42 remains when the second augmented SGW 84 is augmented with the offloaded SGSN U-plane functionality 74. In other applications, when the second augmented SGW 84 is augmented with the offloaded SGSN U-plane functionality, the native SGSN U-plane functionality 44 is removed from the SGSN 42.

The second augmented SGW 84 may be further augmented with the UNC U-plane functionality 16 as shown in FIG. 1, thereby combining the embodiments of FIGS. 1 and 2, without departing from the scope of the present invention.

The SGSN 42 may be implemented via a legacy SGSN without departing from the scope of the present invention. A legacy SGSN may be any conventional or preexisting SGSN that is susceptible to yielding or causing a traffic bottleneck in an accompanying network. By selectively offloading, such as by moving or copying, functionality from the legacy SGSN 42 to the UNC 68 or the SGW 84, a traffic bottleneck that would typically form at the legacy SGSN 42 is avoided for certain of data traffic, which is routed or otherwise handled by the SGW 84 instead of the legacy SGSN 42.

Hence, the second UMA network 60 employs an architecture wherein the packet data-plane component represented by the second augmented SGW 84 is augmented with the SGSN U-plane functionality 74. This facilitates efficient delivery of IP services and associated traffic to and from the client 26 without requiring that the services traffic be routed via a legacy SGSN. Augmenting the UNC 68 with the SGSN server functionality 72 facilitates removing and/or bypassing potential bottlenecks resulting from use of the legacy SGSN server 74 positioned in the SGSN 42.

Figure 3:
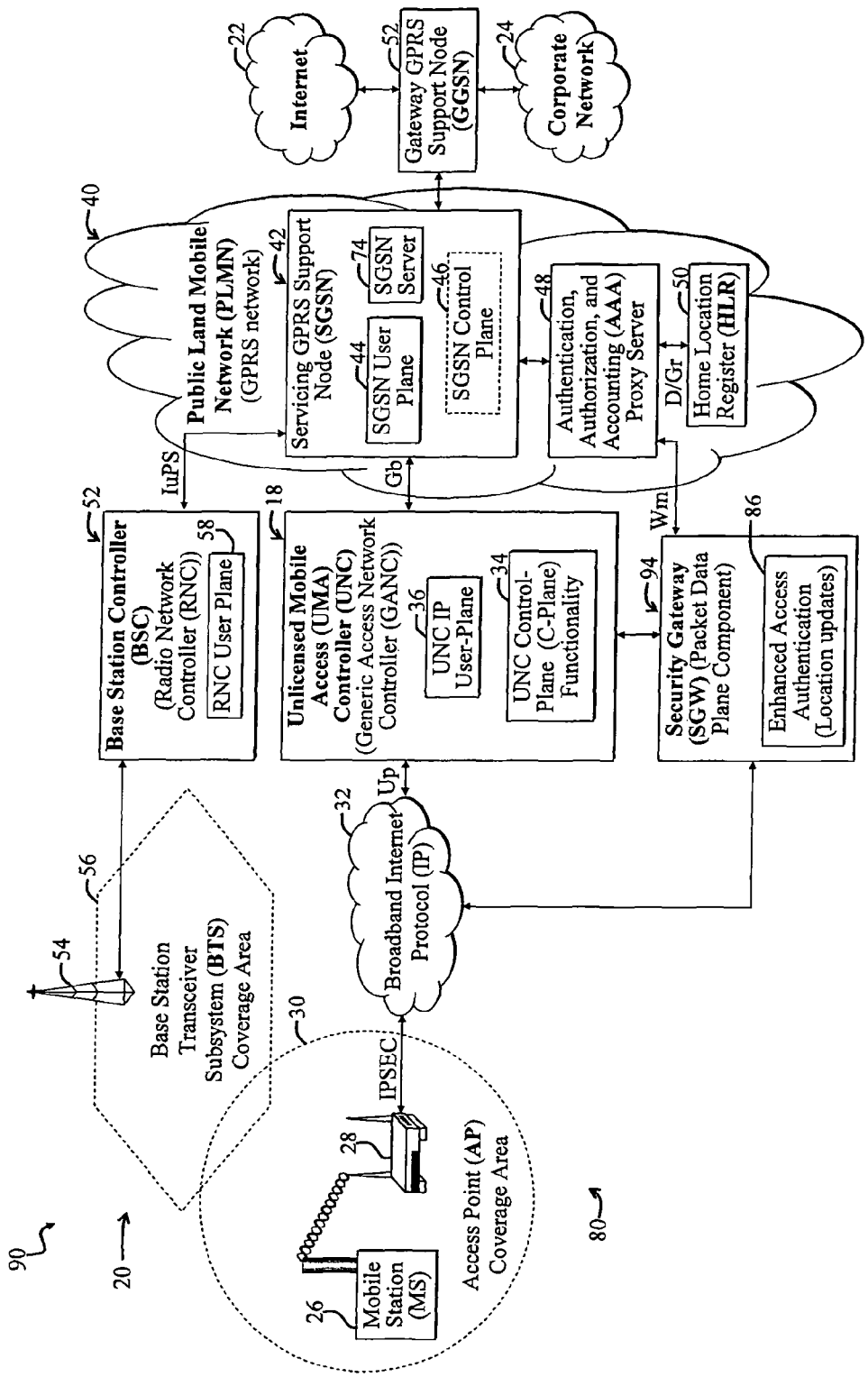
FIG. 3 is a diagram illustrating a UMA network employing an SGW augmented with SGSN Control-plane (C-plane) functionality according to a third embodiment of the present invention.

FIG. 3 is a diagram illustrating a third UMA network 80 according to a third embodiment of the present invention. The third UMA network 80, which is part of a third overall network 90, is similar to the first UMA network 12 of FIG. 1 with the exception that the third UMA network 80 employs a third augmented SGW 94 that is augmented with SGSN C-plane functionality 86. The SGSN C-plane functionality 86 represents enhanced access authentication functionality. Certain functionality from the SGSN control plane 46 is offloaded to the third augmented SGW 94, as represented by the enhanced access authentication functionality 86, to enhance access authentication at the third augmented SGW 94. The enhanced access authentication functionality 86 facilitates enabling the third augmented SGW 94 to track locations of clients, such as locations of the mobile station 26, authenticate clients, terminate IPSEC connections, and so on, all without requiring the legacy SGSN C-plane functionality 46. Consequently, certain traffic bottlenecks associated with the legacy SGSN C-plane functionality 46 are avoided or bypassed by offloading the functionality to the third augmented SGW 94.

For the purposes of the present discussion, a legacy SGSN control plane may be an SGSN control element and/or functionality that is conventionally incorporated in an SGSN module or network of modules. An exemplary SGSN control element performs functions associated with layers 5-7 of the OSI standard.

To authenticate a network entity, such as a client, may mean to identify the network entity and verify or otherwise determine if the network entity may access certain network services. Network services may be any functionality usable by a network entity, such as a client. Examples of network services includes SMS or VOIP functionality.

Hence, the UMA network 80 facilitates bypassing the SGSN control plane 46, also called the SGSN control element, by enhancing the access authentication functionality 86 at the data plane corresponding to the third augmented SGW 94. For the purposes of the present discussion, access-authentication functionality may be any functionality pertaining to user access to a network. Examples of access-authentication functionality include routines for facilitating providing location updates to one or more network entities, wherein the location updates pertain to locations of network entities, such as mobile stations that are connected to the network.

Accordingly, the enhanced access authentication functionality 86 includes sufficient resources and routines to map data associated with various interactions between the UMA and the mobile station 26 at the data plane that is represented by the third augmented SGW 94. This may further enable the SGW 94 to bypass the SGSN server 74 and accompanying bottlenecks, which would typically be used to facilitate implementing access authentication functionality via the AAA server 48 and the HLR 50.

Figure 4:
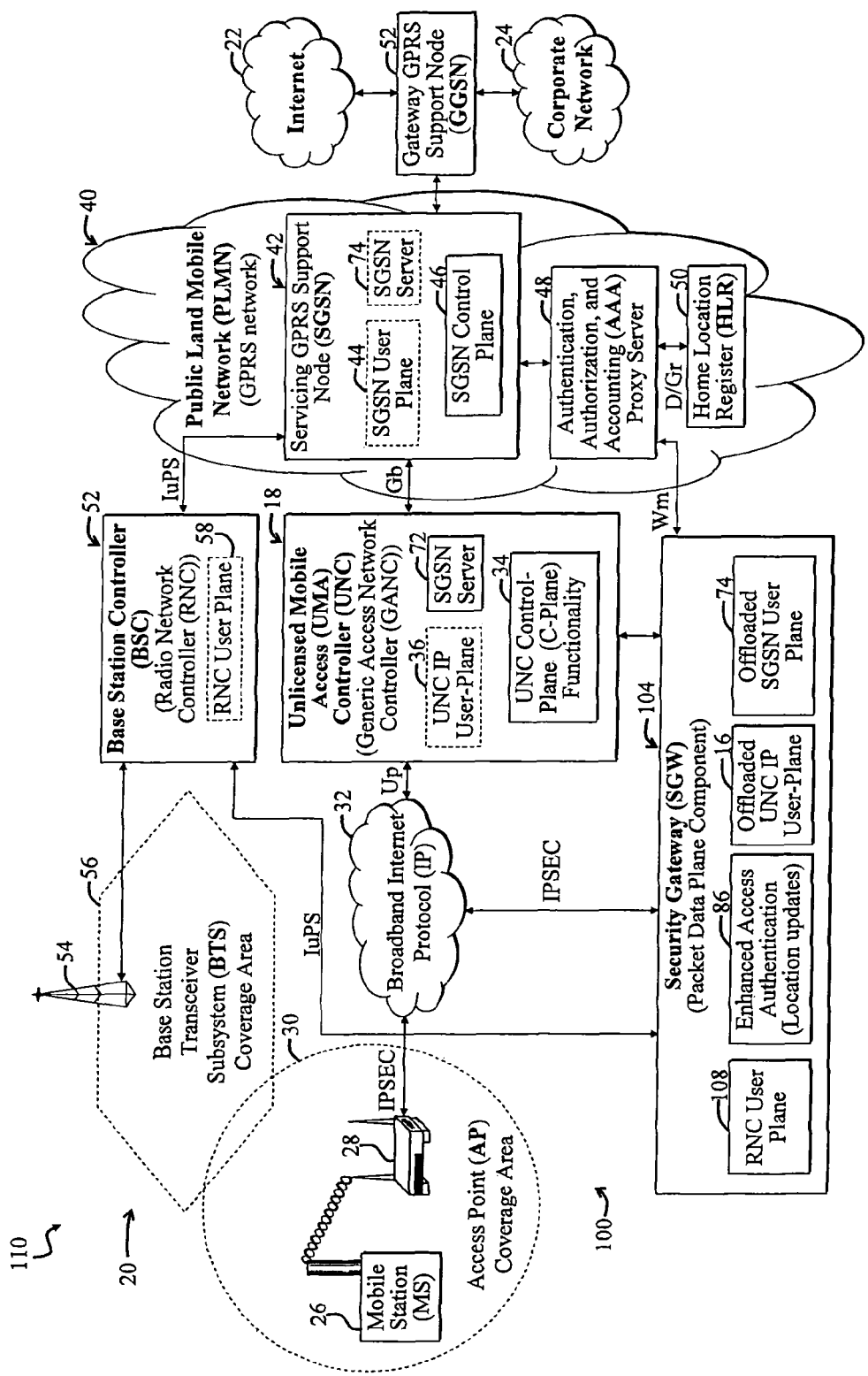
FIG. 4 is a diagram illustrating a UMA network employing an SGW augmented with RNC U-plane functionality according to a fourth embodiment of the present invention.

FIG. 4 is a diagram illustrating a fourth UMA network 100 employing a fourth augmented SGW 104 that is augmented with offloaded RNC U-plane functionality 108 according to a fourth embodiment of the present invention. The fourth UMA network 100 is part of a fourth overall network 110. The fourth UMA network 100 is similar to the networks of FIGS. 1-4 with the exception that the fourth UMA network 100 includes a fourth augmented SGW 104 in place of the SGWs 14, 84, 94 of FIGS. 1-3. The fourth augmented SGW 104 includes offloaded functionality 16, 74, 86 corresponding to the SGWs 14, 84, 94 of FIGS. 1-3, respectively, in addition to offloaded RNC U-plane functionality 108.

The RNC U-plane functionality 108 represents functionality, including sufficient hardware and/or software routines and resources capable of supporting an IuPS interface and associated protocols, such as RANAP protocols, between the fourth augmented SGW 104 and the BSC 52. This enables bypassing of the SGSN 42 in certain cases, such as cases when traffic is to be routed between the fourth UMA network 100 and the cellular network 20.

Hence, a third Generation (3G) UMA/GAN architecture may be enhanced or altered in accordance with an embodiment of the present invention by further augmenting a packet data-plane component, such as the fourth augmented SGW 104, with RNC U-plane functionality 108. This then allows origination of GPRS Tunneling Protocol (GTP)-U signaling from the packet data plane component 104, while simultaneously supporting RANAP/Iu-PS from an evolved augmented SGW 104, which may be included in or be considered part of the UNC 18. Conventionally, GTP-U facilitates transferring user data in separated tunnels for each Packet Data Protocol (PDP) context. A PDP context may be a data structure, which conventionally resides on both the SGSN 42 and the GGSN 52, that contains session information pertaining to an active communication session established between the mobile station 26 and the UMA network 100.

In the present specific embodiment, when the mobile station 26 first establishes communications with the UMA 100, it may attach and activate a PDP context, i.e., it may allocate a PDP context data structure in the SGW 104 instead of in SGSN 42 and the GGSN 52. The data may include identification numbers associated with the mobile station 26, the IPSEC tunnel established by the mobile station 26, and so on. The resulting UMA 100 may then by-pass SGSN U-plane functionality 44, such as by using a so-called one-tunnel approach. Suitable one-tunnel approaches are known in the art, as disclosed in a document entitled "(3GPP TR 23.873 V.4.0.0 (2001-03)): 3$^{rd}$ Generation Partnership Project (3GPP); Technical Specification Group Services and System Aspects; Feasibility Study for Transport and Control Separation in the PS CN Domain (Release 4)."

FIG. 5 is a flow diagram of a method 120 adapted for use with the networks 10, 70, 90, 110 of FIGS. 1-4. The method 120 includes an initial step 122 that includes employing a UMA network or GAN to facilitate delivering an IP service to a client via an unlicensed spectrum.

A subsequent bypassing step 124 includes bypassing one or more bottlenecks in the UMA or GAN by selectively distributing functionality in the UMA or the GAN, including offloading functionality from a UNC or GANC and/or an SGSN module to a data-plane component, such as an SGW, that communicates with the UNC or GANC or is otherwise included within the UNC or GANC.

Although embodiments of the invention are discussed primarily with respect to networks employing wireless unlicensed spectrum, embodiments of the present invention may be adapted to any network exhibiting traffic bottlenecks that would be alleviated by selectively shifting functionality to an offload device. Furthermore, any acceptable architecture, topology, protocols, or other network and digital processing features can be employed. In general, network modules, such as access points, endpoints, and so on, can be implemented via any device with processing ability or other requisite functionality.

Although processes of the present invention and the hardware executing the processes may be characterized by language common to a discussion of the Internet (e.g., "client," "server," etc.), it should be apparent that operations of the present invention can execute on any type of suitable hardware in any communication relationship to another device on any type of link or network.

Although a process of the present invention may be presented as a single entity, such as software executing on a single machine, such software can readily be executed on multiple machines. That is, there may be multiple instances of a given software program, a single program may be executing on two or more processors in a distributed processing environment, parts of a single program may be executing on different physical machines, etc. Furthermore, two different programs, such as a client and server program, can be executing in a single machine, or in different machines. A single program can be operating as a client for one information transaction and as a server for a different information transaction.

Any type of processing device can be used as a client. For example, portable computing devices such as a personal digital assistant (PDA), cell phone, laptop computer, or other devices can be employed. In general, the devices and manner of specific processing (including location and timing) are not critical to practicing important features of the present invention.

Although the invention has been discussed with respect to specific embodiments thereof, these embodiments are merely illustrative, and not restrictive, of the invention. Embodiments of the present invention can operate between any two processes or entities including users, devices, functional systems, or combinations of hardware and software. Peer-to-peer networks and any other networks or systems where the roles of client and server are switched, change dynamically, or are not even present are within the scope of the invention.

Any suitable programming language can be used to implement the routines or other instructions employed by various network entities. Exemplary programming languages include C, C++, Java, assembly language, etc. Different programming techniques can be employed such as procedural or object oriented. The routines can execute on a single processing device or multiple processors. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "machine-readable medium" or "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory.

A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented in whole or in part by using a programmed general purpose digital computer; by using application specific integrated circuits, programmable logic devices, field programmable gate arrays, optical, chemical, biological, quantum or nanoengineered systems or mechanisms; and so on. In general, the functions of the present invention can be achieved by any means as is known in the art. Distributed or networked systems, components, and/or circuits can be used. Communication, or transfer of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow "a", an and "the" include plural references unless the context clearly dictates otherwise. Furthermore, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A system comprising:
    an unlicensed mobile access (UMA) controller (UNC);
    a security gateway (SGW) in communication with the UNC, wherein the SGW includes functionality to route user-plane packets in the UMA, and wherein the functionality includes UNC user-plane functionality off-loaded from the UNC to the SGW;
    a processor; and
    a machine-readable storage medium coupled to the processor, the machine-readable storage medium including:
        one or more instructions for performing a gateway function between a client and the UMA controller;
        one or more instructions for performing a function associated with a servicing general packet radio services support node (SGSN); and
        one or more instructions for performing a function associated with the UMA controller;
    wherein the SGSN user-plane functionality is adapted to enable the SGW to route internet protocol (IP) services and associated data within the UMA without passing the IP services and associated data through a legacy SGSN module.

2. The network architecture of claim 1, wherein the UNC user-plane functionality is adapted to enable the SGW to bypass the UNC when routing user-plane packets in the UMA network.

3. The network architecture of claim 1, wherein the UNC further includes SGSN-server functionality, thereby enabling the UNC to bypass a legacy SGSN server included in the UMA network.

4. The network architecture of claim 1, wherein the functionality includes access-authentication functionality sufficient to enable the SGW to enable the SGW to bypass a legacy SGSN control plane.

5. The network architecture of claim 4, wherein the access-authentication functionality includes functionality sufficient to provide location updates pertaining to a location of a mobile station coupled to the network.

6. The network architecture of claim 4, wherein the functionality includes one or more modules adapted to map interactions between the mobile station and the SGW without use of a legacy SGSN server.

7. The network architecture of claim 1, wherein the outside network includes a cellular network with a radio network controller (RNC).

8. The network architecture of claim 7, wherein the functionality included in the SGW includes RNC user-plane functionality sufficient to enable communications between the SGW and the RNC.

9. The network architecture of claim 8, wherein the RNC user-plane functionality is adapted to accommodate one or more protocols for establishing a packet switched user interface (IuPS) interface between the SGW and the RNC.

10. The network architecture of claim 8, wherein the RNC user-plane functionality includes support for a radio access network application part (RANAP) protocol.

11. A method comprising:
employing an unlicensed mobile access (UMA) network or a generic access network (GAN) to facilitate delivering an internet protocol (IP) service to a client via the unlicensed spectrum;
bypassing one or more bottlenecks in the UMA or GAN by employing selectively distributed functionality in the UMA;
performing a gateway function between a client and an unlicensed mobile access (UMA) controller;
performing a function associated with a servicing general packet radio services support node (SGSN); and
performing a function associated with the UMA controller; and
routing user-plane packets in the UMA, wherein the routing is performed by a security gateway (SGW) in communication with a UMA controller (UNC), and wherein the SGW includes UNC user-plane functionality offloaded from the UNC to the SGW, wherein the user-plane functionality is adapted to enable the SGW to route internet protocol (IP) services and associated data within the UMA without passing the IP services and associated data through a legacy SGSN module.

12. A non-transitory machine-readable medium including instructions executable by a processor, the machine-readable medium one or more instructions for:
facilitating delivery of an IP service to a client via the unlicensed spectrum; and
selectively routing packets associated with the service between the network and one or more additional networks, while bypassing a conventional unlicensed mobile access (UMA) network controller (UNC), generic access network controller (GANC), and/or servicing general packet radio services support node (SGSN) included in the network;
performing a gateway function between the client and the UMA controller;
performing a function associated with a servicing general packet radio services support node (SGSN); and
performing a function associated with the UMA controller; and
routing user-plane packets in the UMA, wherein the routing is performed by a security gateway (SGW) in communication with a UMA controller (UNC), and wherein the SGW includes UNC user-plane functionality offloaded from the UNC to the SGW, wherein the user-plane functionality is adapted to enable the SGW to route internet protocol (IP) services and associated data within the UMA without passing the IP services and associated data through a legacy SGSN module.

13. An apparatus comprising:
a first terminal adapted to receive a first connection from a client;
a second terminal adapted to receive a second connection from an unlicensed mobile access (UMA) controller;
a third terminal adapted to receive a third connection from an authentication, authorization, and accounting (AAA) server;
a processor;
a machine-readable storage medium coupled to the processor, the machine-readable storage medium including:
one or more instructions for performing a gateway function between the client and the UMA controller;
one or more instructions for performing a function associated with a servicing general packet radio services support node (SGSN); and
one or more instructions for performing a function associated with the UMA controller;
a UMA controller (UNC); and
a security gateway (SGW) in communication with the UNC, wherein the SGW includes functionality to route user-plane packets in the UMA, and wherein the functionality includes UNC user-plane functionality offloaded from the UNC to the SGW.

14. The apparatus of claim 13, wherein the module includes a UMA controller internet protocol (IP) user plane.

15. The apparatus of claim 13, wherein the module includes an SGSN user plane.

16. The apparatus of claim 13, wherein the module is configured to perform one or more routines for enhancing authentication capabilities of the apparatus via SGSN control-plane functionality implemented via the one or more routines.

17. The apparatus of claim 13, wherein the module is configured to perform one or more routines that represent a Radio Network Controller user plane.

* * * * *